(12) United States Patent
Bray

(10) Patent No.: US 8,338,979 B2
(45) Date of Patent: Dec. 25, 2012

(54) METHOD AND APPARATUS FOR A SUPERCONDUCTING DIRECT CURRENT GENERATOR DRIVEN BY A WIND TURBINE

(75) Inventor: James William Bray, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/173,633

(22) Filed: Jun. 30, 2011

(65) Prior Publication Data

US 2012/0049531 A1     Mar. 1, 2012

(51) Int. Cl.
  *F03D 9/00*   (2006.01)
  *H02P 9/04*   (2006.01)
  *H02K 9/00*   (2006.01)

(52) U.S. Cl. .......................... 290/44; 310/52
(58) Field of Classification Search .................. 290/44; 310/52
  See application file for complete search history.

(56) References Cited

U.S. PATENT DOCUMENTS

| | | | | |
|---|---|---|---|---|
| 3,742,265 A * | 6/1973 | Smith, Jr. | | 310/52 |
| 3,764,835 A * | 10/1973 | Luck et al. | | 310/52 |
| 4,013,908 A * | 3/1977 | Weghaupt | | 310/61 |
| 4,039,848 A | 8/1977 | Winderl | | 290/55 |
| 4,058,746 A * | 11/1977 | Mole et al. | | 310/10 |
| 4,058,747 A * | 11/1977 | Mailfert et al. | | 310/52 |
| 4,396,847 A * | 8/1983 | Weghaupt et al. | | 310/52 |
| 4,577,126 A * | 3/1986 | Mailfert | | 310/52 |
| 4,745,313 A * | 5/1988 | Brunet et al. | | 310/52 |
| 4,808,864 A * | 2/1989 | Brunet et al. | | 310/52 |
| 4,816,708 A * | 3/1989 | Laumond | | 310/52 |
| 5,032,748 A * | 7/1991 | Sakuraba et al. | | 310/52 |
| 5,256,924 A * | 10/1993 | Fischer | | 310/233 |
| 5,953,224 A | 9/1999 | Gold et al. | | 363/98 |
| 6,066,906 A * | 5/2000 | Kalsi | | 310/179 |
| 6,160,336 A | 12/2000 | Baker, Jr. et al. | | 310/74 |
| 6,249,058 B1 | 6/2001 | Rea | | 290/55 |
| 6,438,969 B1 | 8/2002 | Laskaris et al. | | 62/51.1 |
| 6,442,949 B1 * | 9/2002 | Laskaris et al. | | 62/51.1 |
| 6,553,773 B2 * | 4/2003 | Laskaris | | 62/64 |
| 6,700,297 B2 * | 3/2004 | Hsu et al. | | 310/266 |
| 6,725,683 B1 * | 4/2004 | Laskaris | | 62/259.2 |
| 6,794,781 B2 * | 9/2004 | Razzell et al. | | 310/114 |
| 6,815,860 B2 * | 11/2004 | Wang et al. | | 310/214 |
| 7,015,779 B2 * | 3/2006 | Markiewicz et al. | | 335/299 |
| 7,042,109 B2 * | 5/2006 | Gabrys | | 290/44 |
| 7,116,006 B2 | 10/2006 | McCoin | | 290/54 |
| 7,453,174 B1 * | 11/2008 | Kalsi | | 310/52 |

(Continued)

OTHER PUBLICATIONS

Carlin, P.W., Laxson, A.S., Mujadi, E.B., "The History and State of the Art of Variable-Speed Wind Turbine Technology", Wind Energy, Feb. 28, 2002, pp. 129-159, vol. 6, Issue 2.

*Primary Examiner* — Pedro J Cuevas
(74) *Attorney, Agent, or Firm* — Ann M. Agosti

(57) ABSTRACT

A direct current generating including an annular armature connectable to rotate with a rotating component of a wind turbine and a stationary annular field winding coaxial to the armature and separated by a gap from the armature. The field winding is configured to include superconducting coil magnets and a support structure connectable to an upper region of a tower of the wind turbine. The direct current generator further including a commutator assembly configured to transfer DC current generated by the rotating armature to a power conversion system.

18 Claims, 5 Drawing Sheets

U.S. PATENT DOCUMENTS

| | | | |
|---|---|---|---|
| 7,821,164 B2 * | 10/2010 | Laskaris et al. | 310/52 |
| 8,204,562 B2 * | 6/2012 | Kwon et al. | 505/166 |
| 8,204,563 B2 * | 6/2012 | Wang et al. | 505/211 |
| 8,212,437 B2 * | 7/2012 | Evangelos et al. | 310/52 |
| 2003/0173862 A1 * | 9/2003 | Wang et al. | 310/261 |
| 2004/0056541 A1 * | 3/2004 | Steinmeyer | 310/52 |
| 2004/0162222 A1 * | 8/2004 | Markiewicz et al. | 505/211 |
| 2008/0161189 A1 * | 7/2008 | Lewis et al. | 505/121 |
| 2008/0197633 A1 * | 8/2008 | Laskaris et al. | 290/44 |
| 2009/0230690 A1 * | 9/2009 | Bray et al. | 290/55 |
| 2010/0089073 A1 * | 4/2010 | Laskaris et al. | 62/51.1 |
| 2011/0082043 A1 * | 4/2011 | Wang et al. | 505/162 |
| 2011/0101982 A1 * | 5/2011 | Huang et al. | 324/318 |
| 2011/0219785 A1 * | 9/2011 | Black et al. | 62/3.1 |
| 2012/0007703 A1 * | 1/2012 | Zhao et al. | 335/216 |

* cited by examiner

000
METHOD AND APPARATUS FOR A SUPERCONDUCTING DIRECT CURRENT GENERATOR DRIVEN BY A WIND TURBINE

BACKGROUND

This invention relates to electrical generators and, particularly, relates to wind turbines and superconducting direct current (DC) generators.

A direct drive generator driven by the blades of the wind turbine is efficient and has minimal losses due to transmission of torque from the turbine blades to the DC generator. Direct drive conventional generators on wind turbine towers generally have a power rating of 6 megawatts (MW) or less.

Conventional direct drive generators typically have low torque density and become too heavy for a wind turbine tower at power ratings above about 6 MW. Gearboxes tend to be unreliable and not suitable for long life service in a wind turbine tower.

In addition, alternating current (AC) wind generators must undergo total power conversion to convert the generated power to 50-60 cycle AC at a particular voltage desired by the grid connection. This conversion is typically accomplished by a power electronics (PE) converter consisting of a rectifier in the first stage to convert the AC to direct current (DC) and then an inverter stage to produce the desired AC.

There is a long felt need for direct drive generators for wind turbines capable of generating higher electrical power, e.g., 10 MW. In addition, there is a need for a DC generator which allows the first stage of the converter to be either eliminated or simplified, thereby providing reductions in cost, size and weight, which allow for economical shipping and installation on a wind turbine tower and concomitant reliability increase.

BRIEF DESCRIPTION

The present application is directed to an embodiment of a superconducting direct current (DC) generator driven by a wind turbine. The direct current (DC) generator including an annular armature, a stationary annular field winding coaxial to the armature and separated by a gap from the armature, a non-rotating support for the field winding; a fixed support, and a commutator assembly. The annular armature is connectable to rotate with a rotating component of a wind turbine. The stationary annular field winding is coaxial to the armature and separated by a gap from the armature. The field winding includes superconducting coil magnets. The fixed support couples the non-rotating support for the field winding to a base fixed to an upper region of the wind turbine. The fixed support is connected at one end region to the non-rotating support and is connected at an opposite end region to the base. The fixed support suspends the field winding over the base. The commutator assembly is configured to transfer DC current generated by the rotating armature to a power conversion system.

Another embodiment of the present application is directed to a direct current (DC) generator including an annular armature driven directly by a wind turbine and rotating with a rotating component of the wind turbine; a non-rotating annular field winding coaxial to the armature and separated by an annular gap from the armature, wherein the field winding includes superconducting coil magnets; a non-rotating support for the field winding; a fixed support coupling the non-rotating support for the field winding to a base fixed to an upper region of the wind turbine, wherein the fixed support is connected at one end region to the non-rotating support and is connected at an opposite end region to the base, and wherein the fixed support suspends the field winding over the base; and a commutator assembly configured to transfer DC current generated by the rotating armature to a power conversion system, the commutator assembly comprising a rotating first portion disposed proximate the annular armature and configured to rotate therewith and a stationary second portion coupled to a stationary platform and configured to receive direct current generated by the rotating armature through the at least two commutator segments.

The present application further provides a method for generating a direct current (DC) for a wind turbine mounted on a tower including generating a magnetic field in a non-rotating annular field winding in a DC generator, wherein the field winding includes superconducting coil magnets and the DC generator is mounted in an upper section of a tower for a wind turbine; applying torque from the wind turbine to rotate an armature of the DC generator, wherein the armature is coaxial and electromagnetically coupled to the superconducting field winding; generating electrical current in the armature by the rotation of the armature around the stationary field winding; transferring the direct current from the rotating armature to a power conversion system via a commutating assembly; cooling the superconducting coil magnets to a superconducting condition using a cooling liquid that is at least partially vaporized as it cools the coils; and condensing the vaporized cooling liquid in a re-condenser elevated above the DC generator, wherein the condensed cooling liquid flows by gravity to the superconducting coil magnets.

These and other features and improvements of the present application will become apparent to one of ordinary skill in the art upon review of the following detailed description when taken in conjunction with the several drawings and the appended claims.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION

A superconducting direct current (DC) generator has been developed with a stationary, or non-rotating, field winding and a rotating armature driven directly by a turbine, such as a wind turbine. The superconducting DC generator may be mounted in the upper region of wind turbine tower and coupled directly to the rotating component of the wind turbine, e.g., the blades. The direct drive generator is sufficiently lightweight to be mounted on top of a conventional wind turbine tower and coupled to conventional rotating wind turbine blades.

The superconducting DC generator provides high torque density, which allows the DC generator to be lightweight, despite the added components needed to cool and insulate the superconducting coils in the field winding. The stationary field winding includes a series of racetrack shaped superconducting coils cooled to cryogenic temperatures. The rotating armature and iron yoke (optional) are connected directly to and turned by the wind turbine. A commutator assembly transfers the current generated by the rotating armature to conductors that may extend down through the frame of the wind turbine.

Figure 1:
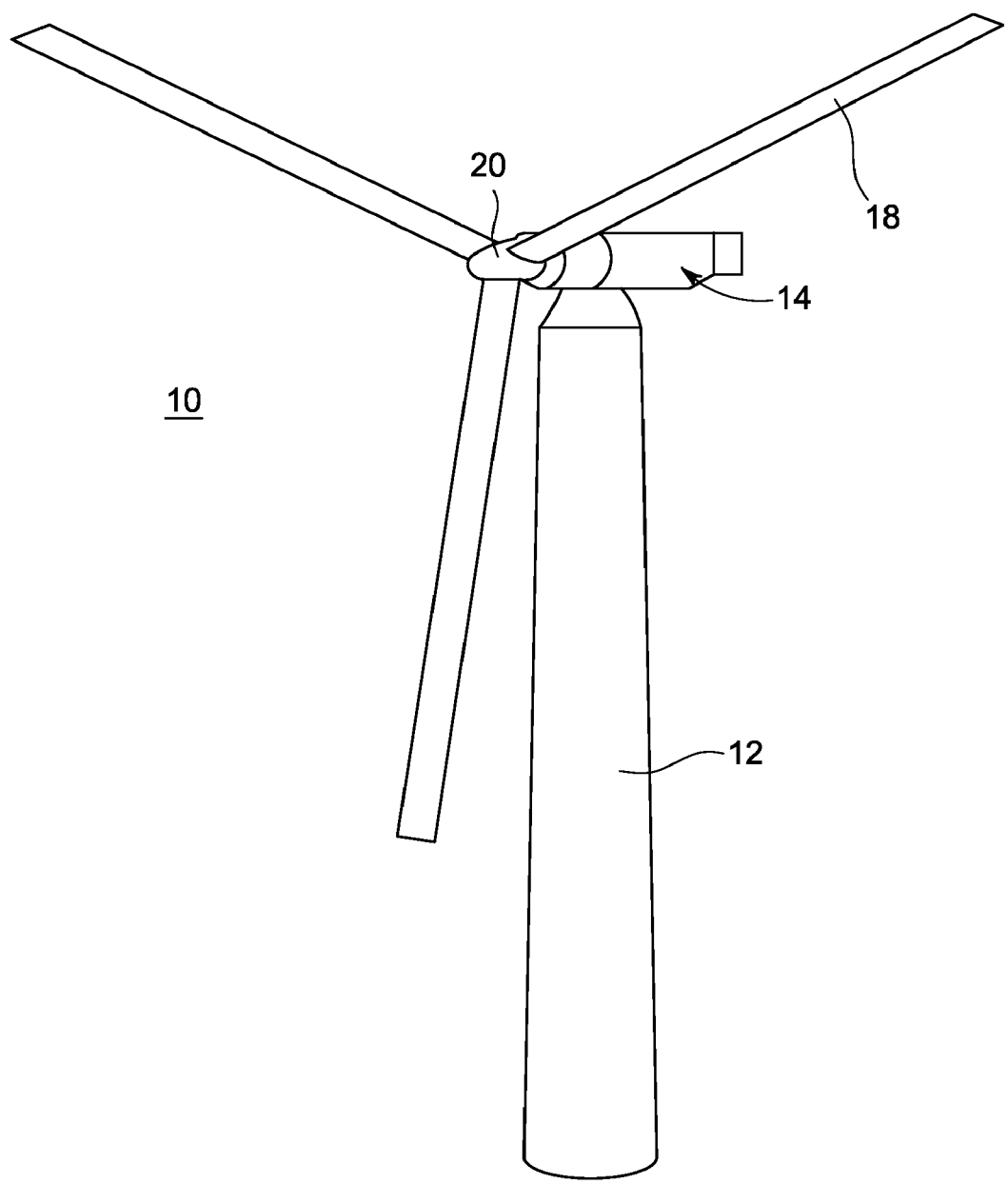
FIG. 1 is a wind turbine having a direct drive, direct current (DC) generator with superconducting electromagnetic components.

FIG. 1 is a front view of a wind turbine 10 that includes a tower 12 anchored to the ground. A superconducting DC generator is housed within a nacelle 14 mounted on top of the tower. The nacelle may rotate about an axis of the tower to align the turbine blades 18 with respect to the wind direction. The blades extend radially outward from a hub 20. The blades 18 typically face into the wind and are turned by the energy of the wind. A DC generator is housed within the nacelle 14 and is driven directly by the hub 20 and blades 18. The rotation of the blades and hub directly drives the armature of the DC generator.

The tower 12 may be between 20 and 100 meters in height, one to two (1 to 2) meters in diameter at the top and four (4) meters in diameter at the ground base. The tower may be constructed of tapered tubular steel, but may also be made from a lattice structure or from concrete sections. The turbine blades 18, each of 10-45 meters in length are equally spaced around the hub 20. While the blades may be made of any suitable material, they are typically formed of a glass fiber reinforced plastic or epoxy. The blades may have a fixed pitch or a variable pitch, depending on whether a variable pitch gearbox is included in the hub. The dimensions of the tower and blades and their compositions are outside the scope of this application and are known to persons of ordinary skill in the art of large scale wind turbines used for electrical power generation.

Figure 2:
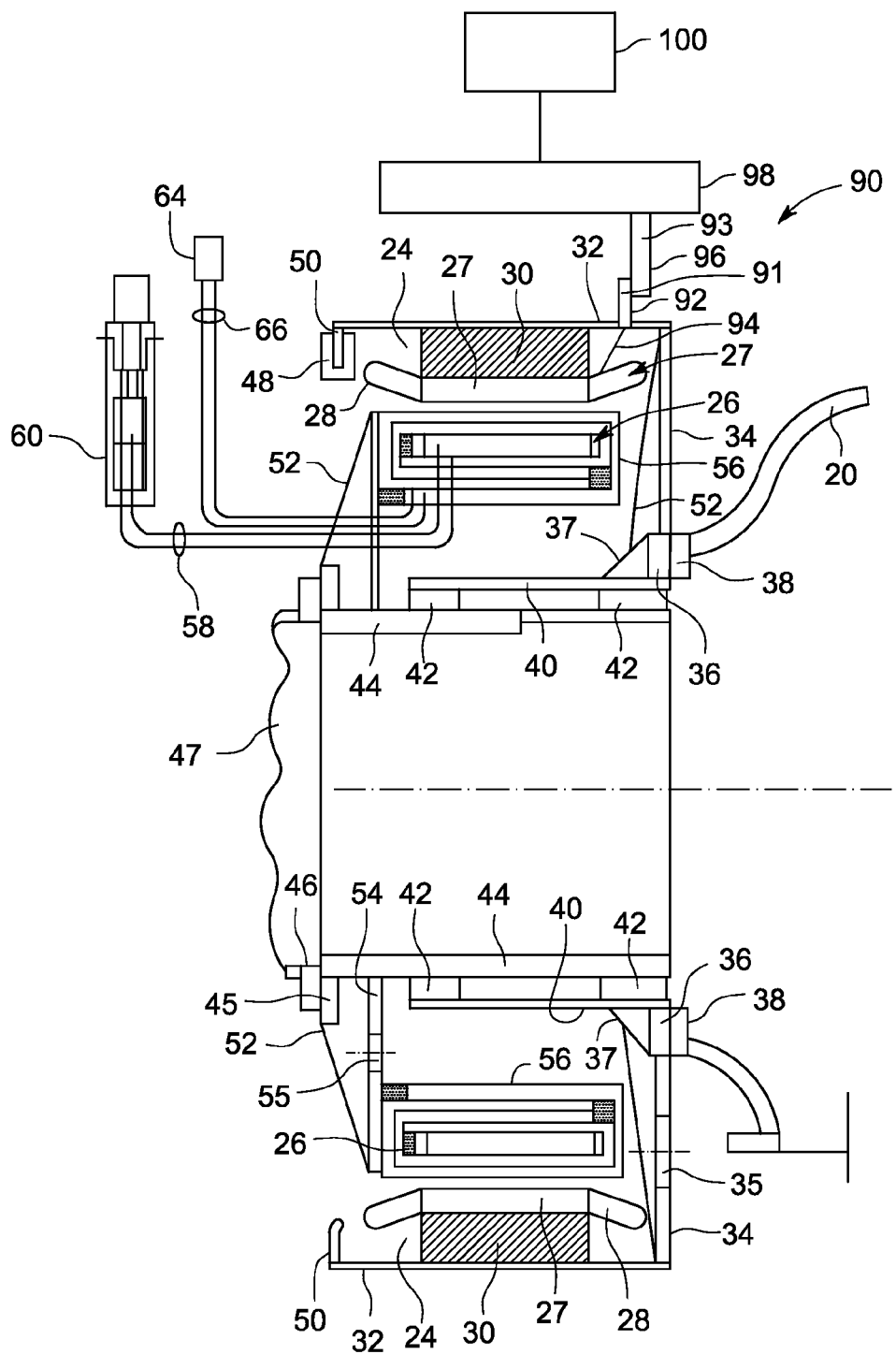
FIG. 2 is a schematic diagram showing in cross-section a direct drive DC generator having an annular rotating armature and a stationary super-conducting field winding surrounded by the armature.

FIG. 2 is a schematic diagram showing in cross-section a direct drive generator 22 having an annular rotating armature 24 and a stationary superconducting field winding assembly 26 surrounded by the armature. The rotating armature 24 is an outer annular ring around the field winding assembly 26. The armature is formed conventionally and may comprise conductive windings 27, e.g., coils or bars, arranged longitudinally along the length of the armature and on an inside cylindrical surface of the armature. By way of example, the longitudinal sections of the armature windings may be 29 to 30 inches in length, have a thickness of 4 to 5 inches and an inside diameter of between 135 to 136 inches. The coils or bars may be connected at their opposite ends to one another by conductive end turns 28. The end turn connections between the longitudinal coils or bars are dependent on their number and arrangement, and the phases of electricity to be generated in the armature windings. The inside cylindrical surface of the armature windings is separated by a narrow air gap, e.g., about 1-2 inches, from the outer surface of the stationary superconducting field winding assembly 26.

The annular rotating armature 24 includes a cylindrical yoke 30 that supports the coils and bars 27. The outer surface of the yoke 30 is fixed to a cylindrical housing 32 that rotates with the armature. The diameter of the housing 32 may be, for example, between 147 to 148 inches and have a length of 58 inches. The housing is fitted to a circular disc 34 that supports the housing and armature 24. The disc has a circular aperture at its center that is mounted to an annular bracket 36 to which is attached the annular base 38 of the hub 20 of the wind turbine. The bracket 36 and base 38 may be secured together by bolts arranged in a circular array around the bracket and base. The disc 34 may have openings or holes 35 for weight reduction. The bracket 36 is mounted on an end of a rotating cylindrical support tube 40 that is radially inward of the armature winding. A reinforcing ring 37 is fixed to the inner corner between the bracket 36 and support tube 40. The support tube 40 may be, for example, between 62 to 63 inches in diameter.

Figure 3:
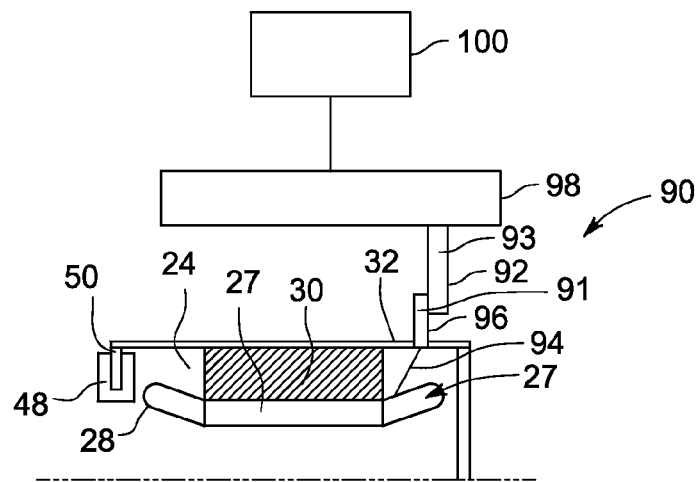
FIG. 3 is schematic diagram showing in cross-section the cryostat for the superconducting field winding.

To convert the generated mechanical energy into DC electrical energy, as the rotating armature 24 turns, the current in the armature coils 27 is commutated to produce a direct current output by a commutator assembly 90. In the illustrated preferred embodiment, the commutator assembly 90 is configured as a plurality of circumferential rings proximate an outside surface of the housing 32 or circular disc 34. It is anticipated that the commutator assembly 90 may be disposed at any convenient location exterior the rotating housing 32. Positioning of the commutator assembly 90 closer to the axis of rotation will allow shorter circumferences. The commutator assembly 90 is generally comprised of a rotating first portion 91 that rotates with the rotating armature 24 as it turns and a stationary second portion 93 that remains stationary. More specifically, in a preferred embodiment the commutator assembly 90, and more particularly the rotating first portion 91 is comprised of a plurality of conductive segments 92, formed of a material such as copper. In this particular embodiment, the commutator assembly 90 is comprised of at least two rotating commutator segments 92. The commutator segments 92 are configured to rotate with, and are electrically connected to, the rotating armature coils 27 via a plurality of electrical connections 94. The number of segments and electrical connections are variable and determined by the number of electrical poles selected by the generator designer. The stationary second portion 93 of the commutator assembly 90 is completed by a fixture holding a plurality of commutator brushes 96, and in this particular embodiment, at least two commutator brushes 96. The commutator brushes 96 are typically comprised of carbon, remain stationary, and are held by a stationary platform 98 configured to take an output current from the commutator brushes 96 to a power conversion system 100. The commutator brushes 96 are configured to ride or brush on the rotating commutator segments 92 as they rotate. The commutator brushes 96 may be held in position by way of spring tension, and may include grounded and ungrounded brushes. As electrical energy is generated, the energy is conducted through the commutator brushes 96 and the rotating commutator segments 92 to the stationary platform 98, and ultimately to the power conversion system 100 that is coupled to a power utility grid, factory or other electrical power load so that the electricity can be used. In an alternative embodiment, as best illustrated in a partial schematic cross-section view in FIG. 3, the rotating first portion 91 of the commutator assembly 90 that rotates with the rotating armature 24 may be comprised of the plurality of commutator brushes 96 and the stationary second portion 93 of the commutator assembly 90 that remains stationary, may be comprised of the plurality of commutator segments 92. In this alternative embodiment, the plurality of rotating commutator brushes 96 are configured to ride or brush on the stationary commutator segments 92 as they rotate. Similar to the reverse configuration previously disclosed for the first and second portions 91, 93 of the commutator assembly 90, as electrical energy is generated, the energy is conducted through the commutator segments and the rotating commutator brushes to the stationary platform 98, and ultimately to the power conversion system 100 that is coupled to a power utility grid, factory or other electrical power load so that the electricity can be used.

A pair of annular bearings 42 arranged towards opposite ends of the support tube 40 rotatably support the support tube 40 on a stationary base tube 44 is attached to a mount 47 that is supported by the floor of the nacelle. A ring bracket 46 may attach mount 47 to a bracket 45 for the base tube. Bolts secure the brackets 45, 46 together. The pair of bearings 42 may be of the same type. Alternatively, the annular bearing 42 near the hub 20 may have a longer length, e.g., 15 to 16 inches, than the annular bearing 42 near the tower, which may have a length of 8 inches. The bearing 42 near the hub is longer because it more directly receives the downward force of the hub and blades and wind, which may be 500,000 pounds of force, and receives a bending moment from the hub, blades and wind, which moment may be 127 times 10 sup 6 inch-pounds at the base 38 and bracket 36.

The support tube 40 may have constant thickness along its length. Alternatively, the base tube 44 may be thick, e.g., two inches, near the tower and thin, e.g., one inch, near the hub. The base tube may reduce in thickness in a step or a taper. The reduction in the thickness reduces the weight of the tube. Similar weight reducing features may include cutouts or holes in the disc 34, light weight materials, e.g., composites, in the housing 32.

A disc brake 48 grasps an annular lip 50 on an end of the housing 32. The brake can slow or stop the rotation of the blades, if the wind becomes excessive and the blades rotate too fast. Thin and lightweight gussets 52 extend from circular disc 34 to the support tube 40. The gussets structurally reinforce the disc 34.

The base tube 44 supports a field winding support disc 54 on which is mounted the stationary field winding assembly 26. The assembly of the base tube 44 and support disc is an exemplary non-rotating support for the field winding assembly 26. The disc may have cutouts or holes 55 to reduce weight. The disc 54 is attached to an end of a cryostat housing 56 containing the superconducting coils of the field winding 26. The housing 56 and its cooling components form a cryostat that cools the superconducting coils of the field winding. The housing for the cryostat 56 may be annular, rectangular in cross section, have an outside diameter of between 134 and 135 inches, and a length of 49 inches. The dimensions of the housing 56 and other components of the DC generator and wind turbine are a matter of design choice and may vary depending on the design of the wind turbine.

The cryostat 56 insulates the superconducting coils so that they may be cooled to near absolute zero, e.g., to 10 Kelvin (K) and preferably to 4K. To cool the windings, the housing 56 includes insulated conduits 58 to receive liquid helium (He) or other similar cryogenic liquid (referred to as cryogen). A conventional two-stage re-condenser 60 mounted in an upper region of the nacelle, on top of the nacelle or on top of the tower, and above the field windings provides cryogen, e.g., liquid He, using a gravity feed. The cryogen flows around the superconducting coil magnets of the field windings and cools the coil magnets to achieve a superconducting condition. The coils are cooled, e.g., to 4 degree K, as the He at least partially vaporizes. The He vapor flows through one of the conduits 58 to the re-condenser 60, where the He is cooled, liquefied and returned via conduit 58 to the coils magnets. The power conductors for the superconducting coils also pass through the housing 56 with the insulated conduits 58 for the helium.

A second re-condenser 64 provides a second cooling liquid, e.g., liquid nitrogen or neon, to an inner thermal shield 70 of the housing 56 for the field winding. The second cooling liquid cools the thermal shield 70 for the superconducting magnets to about 30 degree K to 80 degree K. Cooling the thermal shield assists in supercooling the superconducting winding by reducing the thermal radiation heat adsorbed by the Helium. The second re-condenser 64 receives the vaporized liquid nitrogen or neon from the thermal shield 70, liquefies the nitrogen or neon, and provides liquid nitrogen or neon to the thermal shield via insulated conduits 66. The second re-condenser provides the liquid neon or nitrogen under a gravity feed and is mounted on the tower higher than the housing 56.

Torque is applied by the hub 20 to turn the rotating armature 24 around the stationary super-conducting field winding assembly 26. The rotating support disc 34 transmits the torque from the hub to the rotating armature 24. Torque is applied by the rotating armature 24 to the stationary superconducting field winding assembly 26 due to electromagnetic force (EMF) coupling. The torque applied to the stationary super-conducting field winding assembly 26 is transmitted by the field winding housing 56 to the stationary support disc 54 and to the mount 47 of the tower 12.

Figure 4:
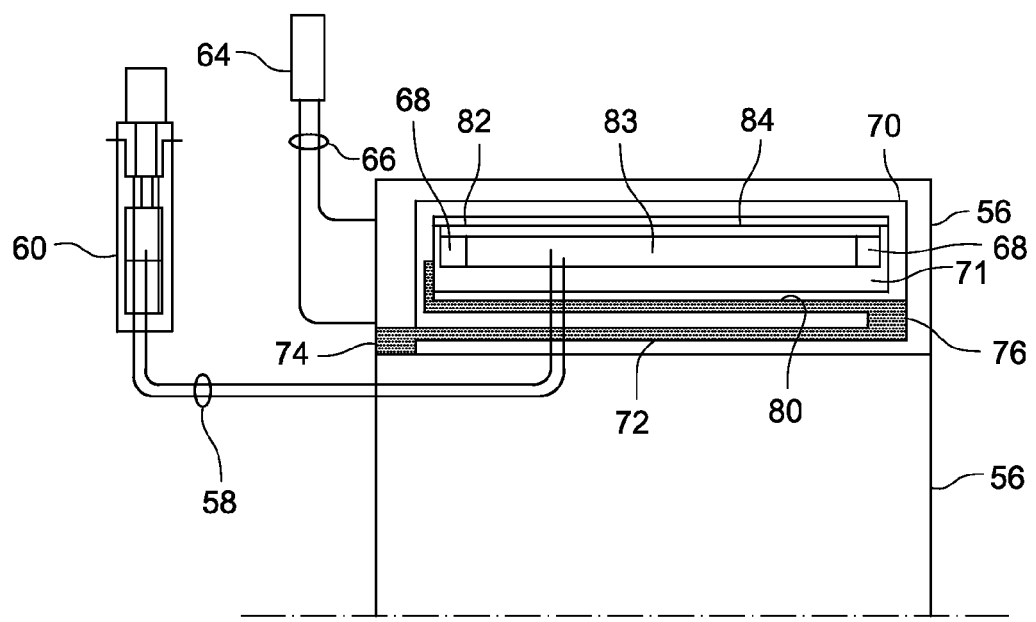
FIG. 4 is a schematic diagram showing in cross-section a portion of the cryostat for the superconducting field winding.

FIG. 4 is a schematic diagram showing in cross-section the cryostat housing 56 for the superconducting coils 68. The interior of the housing is evacuated and that forms an insulating vacuum around the thermal shield 70. A first torque tube 72 suspends the thermal shield 70 in the evacuated interior of the cryostat housing 56. The torque tube 72 is mounted to an annular flange 74 inside the housing. The flange elevates the tube from the inside wall of the housing 56. Another annular flange 76, at the opposite end of the torque tube 72, elevates the thermal shield 70 from the tube and centers the thermal shield inside the housing 56. The torque tube 72 also transmits torque from the thermal shield 70 to the housing 56, and provides thermal insulation to the low temperature thermal shield from the ambient temperature housing 56. The thermal shield 70 is formed of lightweight aluminum.

Suspended in the thermal shield 70 is an annular casing 71. The thermal shield 70 has one flange cooled with liquid nitrogen or neon to thermally insulate casing 71 from thermal radiation heat transfer. The liquid neon or nitrogen is supplied to the thermal shield 70 from the second re-condenser 64, which is elevated above the housing 56. Conduits 66 provide a gravity feed lien for the liquid neon or nitrogen to the thermal shield and a vapor return lien to the re-condenser. The liquid neon or nitrogen circulates through tubing attached to one flange of the thermal shield. As the liquid neon or nitrogen cools the thermal shield, the liquid is vaporized and then returned to the re-condenser. The vapor is condensed in the re-condenser and then fed back to the thermal shield 70.

A second torque tube 80 is supported on one end by a flange 76 on an inner wall of the thermal shield 70. The flange 76 may extend into the interior of the chamber 70 or may comprise two flanges (one inside the thermal shield and the other outside the thermal shield). The flanges may be formed of an insulating material. The second torque tube 80 thermally insulates and suspends the annular casing 71 from the thermal shield. The second torque tube 80 transmits torque from the coils to the first torque tube 72. Both the first and second torque tubes may be formed of titanium alloys.

The insulated conduits 58, 66 and power cables (not shown) for the superconducting coils 68 pass through sealed apertures in the housing 56, thermal shield 70 and, for the first conduit 58 to the casing 71 for the superconducting coils. The housing, thermal shield, and casing provide an insulated and cooled environment within which the superconducting coils can be cooled to cryogenic temperatures, e.g., 4 degree Kelvin. The torque tubes arranged in opposite directions thermally and mechanically isolate the windings and their casings from ambient conditions.

Figure 5:
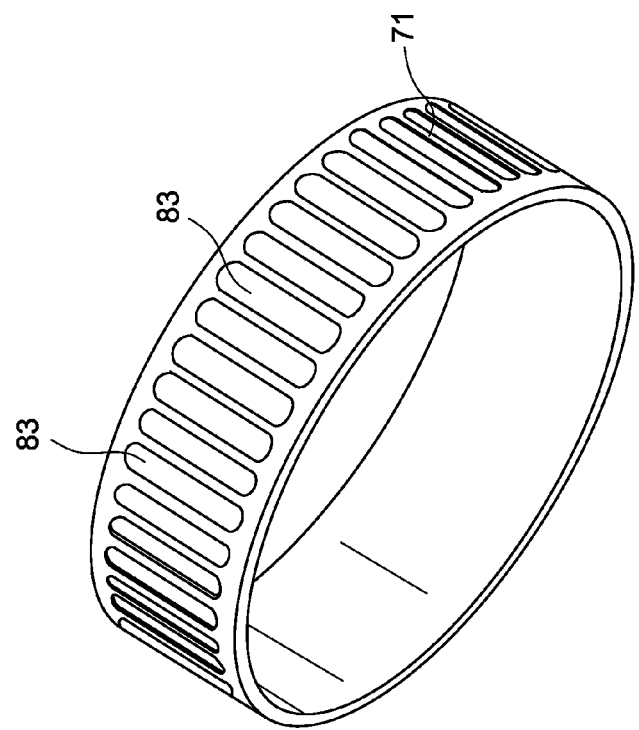
FIG. 5 is a perspective view of a casing ring which supports the coil magnets of the superconducting field winding.

FIG. 5 is perspective view of the casing 71, which forms a vessel to hold the coil magnets 68 in contact with liquid He. The casing 71 may be formed of lightweight aluminum. The casing may be annular and rectangular in cross section. The curvature of the casing conforms to the curvature of the annular chamber 70. The casing may include an annular array of hollow recesses 83 that each receive a race-track shaped coil 68 and a supply of liquid helium. A support bracket 82 is seated in the recess and above each coil magnet. The support bracket conforms to the coil and secures the coil in the recess 83 of the casing. The support bracket allows the cooling liquid to flow over and through superconducting coils. The cooling passages for the superconducting coils are conventional and well known, such as use of superconducting coil magnets for magnetic resonance imaging (MRI) devices.

A cover cylindrical shell 84 seals the hollow center of the casing 71. The casing 71, thermal shield 70 and housing 56 are relatively thin so that the stationary super-conducting field windings 26 may be positioned near the rotating windings of the rotating armature 24. In the disclosed embodiment, the stationary super-conducting field windings, which may have a thickness of about 2-3 inches, may be within two to four inches of the armature windings.

Each superconducting coil 68 may be a group of wires formed in a racetrack shape. The coils are potted to retain the racetrack shape. Each racetrack may have a longitudinal section of two parallel sections that is 29 to 30 inches long and a width of 10 inches, for example.

Each superconducting coil 68 is supported in a recess 83 in the casing 70 and is cooled by a bath of helium to cryogenic temperatures. The superconducting coils 68 are arranged side by side in an annular array extending around the casing. For example, thirty-six (36) coils may form an annular array of field windings that serve as the stator field winding for the DC generator. The superconducting coils 68 may be each formed of (NbTi) wire wrapped in a helix around a racetrack form that may include cooling conduits for the helium.

Figure 6:
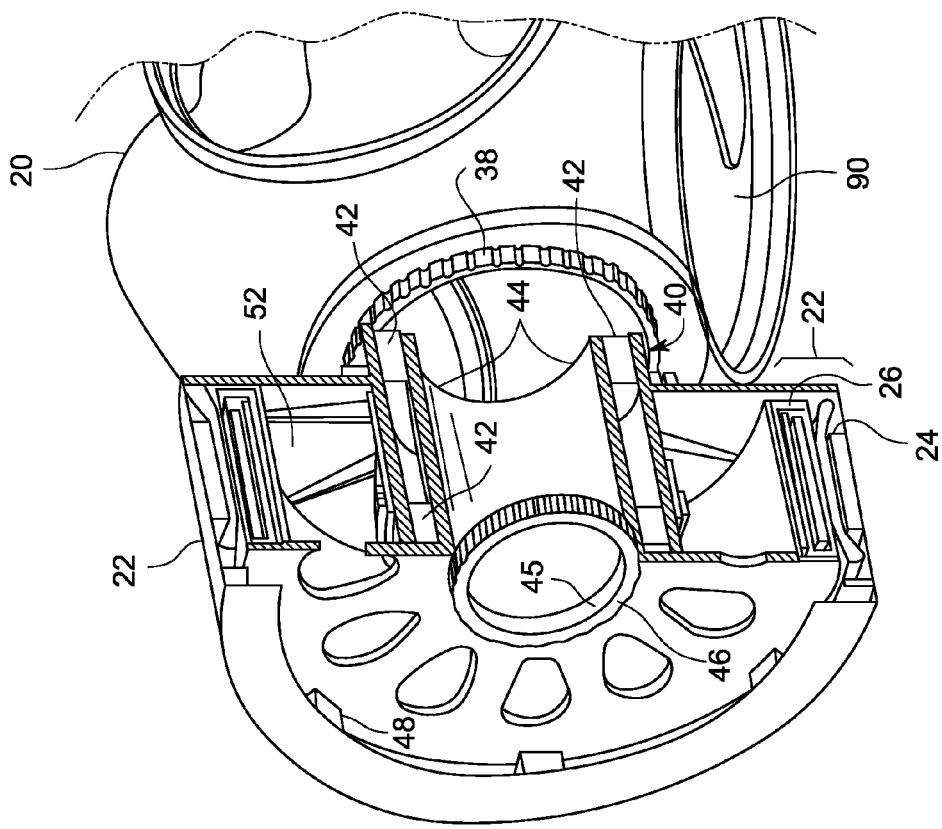
FIG. 6 is a rear and side perspective view of the DC generator and hub for the wind turbine.

FIG. 6 is an enlarged view of the rear and side of the DC generator 22 and its connection to the hub 20. The hub has apertures 85 for the blades. The root of a blade has a cylindrical mount that is fitted to the rim of the aperture. The blade may be fixed to the nose or provided with gearing for a variable pitch mounting of the blade to the hub. The hub 20 includes a base 38 that mounts to flange 36 of the DC generator 22. A circular array of bolts may extend through slots in the base to secure the hub to the flange 36.

Figure 7:
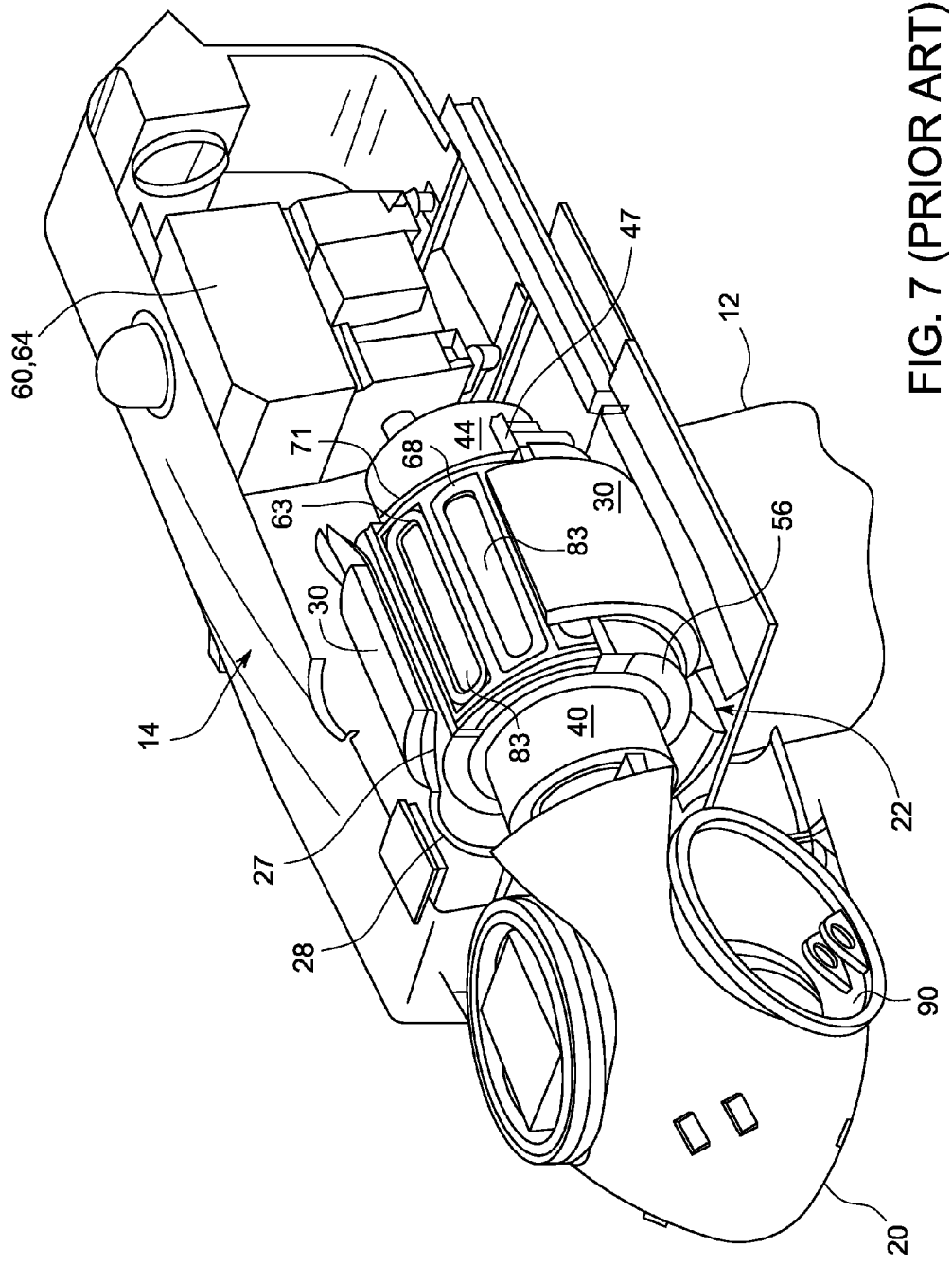
FIG. 7 is a partially cross-sectional view of the nacelle, DC generator, and hub for the wind turbine.

FIG. 7 is a perspective view, partially in cross-section, of the DC generator 22 housed in the nacelle 14 and directly connected to the hub 20 of the wind turbine. The support tube 40 is connected directly to the hub. The support tube also supports the armature with the armature windings 27, 28 and yoke 30. The armature windings 27, 28 are coaxial with and rotate about the superconducting coil magnets 68. These coil magnets are enclosed in the casing 71 and receive cryogen through cooling passages 83. The casing 71 is supported in a cryostat housing 56, which is fixed to a base tube 44. A mount 47 supports the base tube 44 within the nacelle 14.

The cryogen re-condensers 60, 64 may be housed in the nacelle, provided that the cryogen cooling liquid in the recondensers is at least partially elevated above the stationary superconducting field windings 26 to provide for gravity feed of the cryogen to the windings. Alternatively, the re-condensers 60, 64 may be mounted on top of the nacelle.

A DC generator with stationary superconducting field windings and an outer rotating armature, as described above, would have high torque density and be of relatively light weight. The DC generator may achieve a power output of 10 MW or more and be lightweight to fit on top of a tower of a wind turbine. The DC generator is directly driven by the blades of the wind turbine. The 10 MW or more of electrical power is transferred from the armature, through the commutator assembly and to a power inversion system including an electrical conductor that extends down the tower and to an electrical coupling at the base of the tower. The electrical coupling may connect to a power utility, electrical load in a building, factory or home, or other electrical load. Inclusion of a commuter assembly to form a DC generator allows for elimination or simplification of a first stage of a PE converter and may result in a reduction in cost, size and weight and increase of reliability of the converter.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A direct current (DC) generator comprising:
   an annular armature connectable to rotate with a rotating component of a wind turbine;
   a stationary annular field winding coaxial to the armature and separated by a gap from the armature, wherein the field winding includes superconducting coil magnets;
   a non-rotating support for the field winding;
   a fixed support coupling the non-rotating support for the field winding to a base fixed to an upper region of the wind turbine, wherein the fixed support is connected at one end region to the non-rotating support and is connected at an opposite end region to the base, and wherein the fixed support suspends the field winding over the base; and
   a commutator assembly configured to transfer DC current generated by the rotating armature to a power conversion system, wherein the commutator assembly comprises:
   a rotating first portion disposed proximate the annular armature and configured to rotate therewith; and
   a stationary second portion coupled to a stationary platform and configured to receive energy generated by the rotating annular armature through the rotating first portion as an output direct current.

2. The DC generator of claim 1, wherein the stationary platform is configured in electrical communication with the power conversion system.

3. The DC generator of claim 1, wherein the rotating first portion comprises at least two commutator segments, disposed proximate the annular armature and configured to rotate therewith, the at least two commutator segments configured in electrical contact with the rotating armature.

4. The DC generator of claim 3, wherein the at least two commutator segments are electrically connected to a plurality of wire ends of the annular armature.

5. The DC generator of claim 3, wherein the stationary second portion comprises at least two stationary commutator brushes coupled to the stationary platform and configured to receive energy generated by the rotating armature through the at least two rotating commutator segments as an output direct current.

6. The DC generator of claim 1, wherein the rotating first portion comprises
at least two rotating commutator brushes disposed proximate the annular armature and configured to rotate therewith, the at least two rotating commutator brushes configured in electrical contact with the rotating armature.

7. The DC generator of claim 6, wherein the at least two commutator brushes are electrically connected to a plurality of wire ends of the annular armature.

8. The DC generator of claim 6, wherein the stationary second portion comprises at least two commutator segments, coupled to the stationary platform and configured to receive energy generated by the rotating armature through the at least two rotating commutator segments as an output direct current.

9. The DC generator of claim 1, wherein the generator is mounted on top of a tower.

10. The DC generator of claim 1, further comprising at least one re-condenser mounted at a higher elevation than the field winding.

11. A direct current (DC) generator for a wind turbine mounted on a tower comprising:
an annular armature driven directly by a wind turbine and rotating with a rotating component of the wind turbine;
a non-rotating annular field winding coaxial to the armature and separated by an annular gap from the armature, wherein the field winding includes superconducting coil magnets;
a non-rotating support for the field winding;
a fixed support coupling the non-rotating support for the field winding to a base fixed to an upper region of the wind turbine, wherein the fixed support is connected at one end region to the non-rotating support and is connected at an opposite end region to the base, and wherein the fixed support suspends the field winding over the base; and
a commutator assembly configured to transfer DC current generated by the rotating armature to a power conversion system, the commutator assembly comprising a rotating first portion disposed proximate the annular armature and configured to rotate therewith and a stationary second portion coupled to a stationary platform and configured to receive direct current generated by the rotating armature through the at least two commutator segments.

12. The DC generator of claim 11, wherein the rotating first portion comprises at least two commutator segments, disposed proximate the annular armature and configured to rotate therewith, the at least two commutator segments configured in electrical contact with the rotating armature.

13. The DC generator of claim 12, wherein the stationary second portion comprises at least two stationary commutator brushes coupled to the stationary platform and configured to receive energy generated by the rotating armature through the at least two rotating commutator segments as an output direct current.

14. The DC generator of claim 11, wherein the rotating first portion comprises at least two rotating commutator brushes disposed proximate the annular armature and configured to rotate therewith, the at least two rotating commutator brushes configured in electrical contact with the rotating armature.

15. The DC generator of claim 14, wherein the stationary second portion comprises at least two commutator segments, coupled to the stationary platform and configured to receive energy generated by the rotating armature through the at least two rotating commutator segments as an output direct current.

16. A method for generating a direct current (DC) for a wind turbine comprising:
generating a magnetic field in a non-rotating annular field winding in a DC generator, wherein the field winding includes superconducting coil magnets and the DC generator is mounted in an upper section of a tower for a wind turbine;
applying torque from the wind turbine to rotate an armature of the DC generator, wherein the armature is coaxial and electromagnetically coupled to the superconducting field winding;
generating electrical current in the armature by the rotation of the armature around the stationary field winding;
transferring the direct current from the rotating armature to a power conversion system via a commutating assembly wherein a rotating first portion is disposed proximate the annular armature and configured to rotate therewith, the rotating first portion configured in electrical contact with the rotating armature and a stationary second portion is coupled to a stationary platform and configured to receive energy generated by the rotating first portion;
cooling the superconducting coil magnets to a superconducting condition using a cooling liquid that is at least partially vaporized as it cools the coils; and
condensing the vaporized cooling liquid in a re-condenser elevated above the DC generator, wherein the condensed cooling liquid flows by gravity to the superconducting coil magnets.

17. The method of claim 16, further comprising transferring the direct current via the commutator assembly wherein the rotating first portion comprises at least two commutator segments, disposed proximate the annular armature and configured to rotate therewith, the at least two commutator segments configured in electrical contact with the rotating armature and wherein the stationary second portion comprises at least two stationary commutator brushes coupled to the stationary platform and configured to receive energy generated by the rotating armature through the at least two rotating commutator segments as an output direct current.

18. The method of claim 16, further comprising transferring the direct current via the commutator assembly wherein the rotating first portion comprises at least two rotating commutator brushes disposed proximate the annular armature and configured to rotate therewith, the at least two rotating commutator brushes configured in electrical contact with the rotating armature and wherein the stationary second portion comprises at least two commutator segments, coupled to the stationary platform and configured to receive energy generated by the rotating armature through the at least two rotating commutator segments as an output direct current.

* * * * *